(12) United States Patent
Schmelcher et al.

(10) Patent No.: US 11,558,443 B2
(45) Date of Patent: *Jan. 17, 2023

(54) METHODS, SYSTEMS, AND MEDIA FOR DELIVERING MANIFESTLESS STREAMING MEDIA CONTENT

(71) Applicant: Google LLC, Mountain View, CA (US)

(72) Inventors: Tristan Schmelcher, Sammamish, WA (US); William Cyr, Boston, MA (US); Thomas DeWeese, Boxborough, MA (US); Nils Krahnstoever, Brookline, MA (US); Matthew Carson, San Francisco, CA (US); Pawel Jurczyk, Newton, MA (US); Thomas Dinger, Waltham, MA (US); Jeffrey Calow, Arlington, MA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/233,963

(22) Filed: Apr. 19, 2021

(65) Prior Publication Data
US 2021/0243240 A1  Aug. 5, 2021

Related U.S. Application Data

(63) Continuation of application No. 16/573,090, filed on Sep. 17, 2019, now Pat. No. 10,986,149.

(Continued)

(51) Int. Cl.
*H04L 65/613* (2022.01)
*H04N 21/2187* (2011.01)
(Continued)

(52) U.S. Cl.
CPC ......... *H04L 65/613* (2022.05); *H04L 65/612* (2022.05); *H04N 21/2187* (2013.01); *H04N 21/84* (2013.01); *H04N 21/8586* (2013.01)

(58) Field of Classification Search
None
See application file for complete search history.

(56) References Cited

U.S. PATENT DOCUMENTS

| 9,118,976 B1 | 8/2015 | Reed et al. |
| 2011/0219098 A1 | 9/2011 | Xu et al. |

(Continued)

FOREIGN PATENT DOCUMENTS

| CN | 103392344 | 11/2013 |
| CN | 103491457 | 1/2014 |

(Continued)

OTHER PUBLICATIONS

International Search Report and Written Opinion dated Nov. 6, 2019 in International Patent Application No. PCT/US2019/051433.

(Continued)

*Primary Examiner* — Brian Whipple
(74) *Attorney, Agent, or Firm* — Byrne Poh LLP (57) ABSTRACT

Methods, systems, and media for delivering manifestless streaming media content are provided. In some embodiments, the method comprises: receiving, from a user device, a request for a URL corresponding to a format of a live stream that is provided in a plurality of formats, wherein the live stream comprises a plurality of segments for each of the plurality of formats and wherein each segment of the plurality of segments comprises a respective sequence number; resolving the request to a specific segment of the live stream based on the URL, wherein the resolving comprises: identifying the format of the live stream associated with the request from the plurality of formats based on the URL; identifying a sequence number associated with the request based on the URL; and identifying a segment of the plurality of segments corresponding to the identified format and having a sequence number matching the identified sequence number; loading a segment file corresponding to the specific (Continued)

segment; and returning the segment file to the user device in a response to the request.

21 Claims, 7 Drawing Sheets

Related U.S. Application Data (60) Provisional application No. 62/732,567, filed on Sep. 17, 2018.

(51) Int. Cl.
*H04N 21/84* (2011.01)
*H04N 21/858* (2011.01)
*H04L 65/612* (2022.01)

(56) References Cited

U.S. PATENT DOCUMENTS

| | | | |
|---|---|---|---|
| 2013/0227074 A1 | 8/2013 | Odlund et al. | |
| 2013/0332971 A1 | 12/2013 | Fisher | |
| 2015/0296274 A1 | 10/2015 | Good et al. | |
| 2015/0365450 A1 | 12/2015 | Gaunt et al. | |
| 2017/0272485 A1 | 9/2017 | Gordon et al. | |
| 2018/0183890 A1 | 6/2018 | Patil | |

FOREIGN PATENT DOCUMENTS

| | | |
|---|---|---|
| CN | 103858440 | 6/2014 |
| CN | 104396263 | 3/2015 |
| CN | 105052160 | 11/2015 |
| CN | 105409226 | 3/2016 |
| CN | 106464945 | 2/2017 |
| CN | 108432261 | 8/2018 |
| JP | 2018085764 | 5/2018 |
| WO | WO 2015013687 | 1/2015 |

OTHER PUBLICATIONS

Notice of Allowance dated Dec. 16, 2020 in U.S. Appl. No. 16/573,090.
Examination Report dated Feb. 7, 2022 in IN Patent Application No. 202147016975.
Notice of Allowance dated May 31, 2022 in CN Patent Application No. 201980017813.2.
Office Action dated Sep. 22, 2021 in CN Patent Application No. 201980017813.2.
Office Action dated Sep. 27, 2021 in KR Patent Application No. 10-2020-7026227.
Office Action dated Oct. 18, 2021 in JP Patent Application No. 2021-514587.

METHODS, SYSTEMS, AND MEDIA FOR DELIVERING MANIFESTLESS STREAMING MEDIA CONTENT

CROSS-REFERENCE TO RELATED APPLICATIONS

This application is a continuation of U.S. patent application Ser. No. 16/573,090, filed Sep. 17, 2019, which claims the benefit of U.S. Provisional Patent Application No. 62/732,567, filed Sep. 17, 2018, which is hereby incorporated by reference herein in its entirety.

TECHNICAL FIELD

The disclosed subject matter relates to methods, systems, and media for delivering manifestless streaming media content.

BACKGROUND

The development of digital media content sharing and Internet networking has enabled many features to enhance the user experience. For example, on the Internet, content hosting websites and content sharing services allow users to upload, view, and share digital media content, which may include audio/music clips, video clips, and a combination of audio and video content. A viewer can view the media content that is streamed from a content sharing server to a viewing device for playback. To prevent buffering that disrupts the playback of the media content, the content may be streamed with an adaptive bitrate protocol, such as HTTP Live Streaming (HLS).

HLS is a network protocol for streaming audio and video over HTTP from a web server for playback on various computing devices, where the quality of the streaming content can be changed depending on the network connection of the viewing device. Existing HLS-based approaches for streaming media, however, face a number of challenges. One challenge is high latency. For example, existing HLS-based approaches require a client device to make three round trips to a content sharing server before the client device can play back any video content. The three round trips include a trip to fetch a master playlist, another trip for a media playlist, and yet another trip for an initial media segment. Such requirement substantially increases the latency for content playback especially in situations where the round trip time (RTT) is high, such as, on wireless networks.

Existing approaches for streaming media playback, such as HLS or Dynamic Adaptive Streaming over HTTP (DASH), also lack client control over stream selection when the media player used by a client does not support streams selection. For example, clients using such a media player for streaming video using the HLS protocol are unable to control which media segments to fetch and when to fetch them. If a streaming video is available in multiple bitrates or resolutions, the clients are required to provide a master playlist URL to a media player, where the master playlist contains all available media playlists, each of which corresponds to a representation of the streaming video in a specific bitrate or resolution. During the playback, the media player decides which representation of the streaming video to choose for playback.

Furthermore, existing approaches for streaming video content playback are not efficient to support live video streaming. During live playbacks of streaming media, the client of existing HLS-based streaming video approaches is required to re-fetch the live playlist every several seconds for new media segments. In particular, these protocols incorporate a manifest file that clients must periodically download to discover new media segments of the streaming media. The periodic manifest download and the segment size are examples of end-to-end latency limitations in these protocols.

Accordingly, it is desirable to provide new methods, systems, and media for delivering manifestless streaming media content.

SUMMARY

Methods, systems, and media for delivering manifestless streaming media content are provided. (By "manifestless" streaming media content is meant that the delivery of the streaming media content is effected without requiring a client to download a manifest file.)

In accordance with some embodiments of the disclosed subject matter, a method for delivering live streaming content is provided, the method comprising: receiving, from a user device, a request for a URL corresponding to a format of a live stream that is provided in a plurality of formats, wherein the live stream comprises a plurality of segments for each of the plurality of formats and wherein each segment of the plurality of segments comprises a respective sequence number; resolving the request to a specific segment of the live stream based on the requested URL, wherein the resolving comprises: identifying the format of the live stream associated with the request from the plurality of formats based on the requested URL; identifying a sequence number associated with the request based on the requested URL; and identifying a segment of the plurality of segments corresponding to the identified format and having a sequence number matching the identified sequence number; loading a segment file corresponding to the specific segment; and returning the segment file to the user device in a response to the request.

In some embodiments, the URL comprises a base URL, and wherein the format of the live stream associated with the request is identified from the plurality of formats based on the base URL.

In some embodiments, the segment file comprises metadata indicating the identified sequence number.

In some embodiments, the sequence number is identified by determining a current head sequence number for a most recent segment that is available for playback of the one or more segments, wherein the identified sequence number is the current head sequence number and wherein the identified segment is the most recent segment that is available for playback.

In some embodiments, the sequence number is identified by identifying a sequence number associated with the request that is greater than a sequence number for a most recently complete segment that is available to load based on the URL.

In some embodiments, the method further comprises: iteratively loading one or more portions of the segment file as the one or more portions are being generated; and iteratively returning the generated one or more portions to the user device in a single response.

In accordance with some embodiments of the disclosed subject matter, a system for delivering live streaming content is provided, the system comprising: a memory; and a hardware processor coupled to the memory that is configured to: receive, from a user device, a request for a URL corresponding to a format of a live stream that is provided in a plurality of formats, wherein the live stream comprises a plurality of segments for each of the plurality of formats and wherein each segment of the plurality of segments comprises a respective sequence number; resolve the request to a specific segment of the live stream based on the URL, wherein the resolving comprises: identifying the format of the live stream associated with the request from the plurality of formats based on the URL; identifying a sequence number associated with the request based on the URL; and identifying a segment of the plurality of segments corresponding to the identified format and having a sequence number matching the identified sequence number; load a segment file corresponding to the specific segment; and return the segment file to the user device in a response to the request.

In accordance with some embodiments of the disclosed subject matter, a non-transitory computer-readable medium containing computer-executable instructions that, when executed by a processor, cause the processor to perform a method for delivering live streaming content is provided, the method comprising: receiving, from a user device, a request for a URL corresponding to a format of a live stream that is provided in a plurality of formats, wherein the live stream comprises a plurality of segments for each of the plurality of formats and wherein each segment of the plurality of segments comprises a respective sequence number; resolving the request to a specific segment of the live stream based on the requested URL, wherein the resolving comprises: identifying the format of the live stream associated with the request from the plurality of formats based on the requested URL; identifying a sequence number associated with the request based on the requested URL; and identifying a segment of the plurality of segments corresponding to the identified format and having a sequence number matching the identified sequence number; loading a segment file corresponding to the specific segment; and returning the segment file to the user device in a response to the request. In accordance with further embodiments of the disclosed subject matter, a computer-readable medium is provided, which may be a transitory computer-readable medium or a non-transitory computer-readable medium. The computer-readable medium contains computer-executable instructions that, when executed by a processor, cause the processor to perform a method according to any aspect or embodiment for delivering live streaming content.

In accordance with some embodiments of the disclosed subject matter, a system for delivering live streaming content is provided, the system comprising: means for receiving, from a user device, a request for a URL corresponding to a format of a live stream that is provided in a plurality of formats, wherein the live stream comprises a plurality of segments for each of the plurality of formats and wherein each segment of the plurality of segments comprises a respective sequence number; means for resolving the request to a specific segment of the live stream based on the requested URL, wherein the means for resolving comprises: means for identifying the format of the live stream associated with the request from the plurality of formats based on the requested URL; means for identifying a sequence number associated with the request based on the requested URL; and means for identifying a segment of the plurality of segments corresponding to the identified format and having a sequence number matching the identified sequence number; means for loading a segment file corresponding to the specific segment; and means for returning the segment file to the user device in a response to the request.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for delivering streaming content are provided. In some embodiments, the mechanisms described herein can allow arbitrary application-level metadata to be supported without requiring support at the content delivery network level to cache metadata that is separate from the segment file. Additionally or alternatively, in some embodiments, the mechanisms described herein can allow delivery of streaming content without requiring periodic delivery of a separate manifest file containing the metadata and/or information to discover new segments of a content stream, thereby reducing end-to-end latency. Additionally or alternatively, in some embodiments, the mechanisms described herein can allow a user device to access non-head segments of a stream, this allowing control of which media segment(s) to fetch In some embodiments, the mechanisms described herein can be used to deliver streaming content. For example, in some embodiments, the mechanisms described herein can be used to request a Uniform Resource Locator (URL) for playback of a content stream, as described below in connection with FIG. 1. In a more particular example, a URL can include a base URL that corresponds to a format of the content stream. In continuing this example, in some embodiments, the URL can also include one or more URL parameters for indicating a sequence number associated with the request.

In some embodiments, a content stream can be provided for playback in one or more formats, such as a codec format, a resolution format, an audio format, a video format, and/or any other suitable format. For example, in some embodiments, a content stream that is being uploaded by a broadcaster or content creator at a 1280×720 pixels resolution can have formats for 720p H.264 video (1280×720 pixels), 480p H.264 video (854×480 pixels), 360p H.264 video (640×360 pixels), 240p H.264 video (426×240 pixels), 144p H.264 video (256×144 pixels), AAC audio, and/or any other suitable format. In some embodiments, a content stream can be segmented into one or more segments of approximately constant duration for each format of video and/or audio that is available for playback. In some embodiments, each segment can be a few seconds in duration or any other suitable duration. In some embodiments, the content stream can be a live stream.

In some embodiments, a web server can provide one base URL for each format (e.g., codec format, resolution format, audio format, video format, and/or any other suitable format) of a content stream that is available for playback. Continuing the above example, in some embodiments, a web server can provide one base URL for each of 720p H.264 video, 480p H.264 video, 360p H.264 video, 240p H.264 video, 144p H.264 video, AAC audio, and/or any other suitable format. In some embodiments, the base URL can be for a Hypertext Transfer Protocol (HTTP), a Hypertext Transfer Protocol Secure (HTTPS) protocol, a Quick UDP Internet Connections (QUIC) protocol, and/or any other suitable protocol.

In some embodiments, the base URL for each format can locate a dynamically-determined head segment file for that format. In some embodiments, the head segment can be the most recent segment of a live stream that is available to be loaded. In some embodiments, a request for a base URL can be resolved to a specific segment identified by a sequence number, where the sequence number can be a dense integer index for a segment timeline (where a "dense" index is one where an index entry appears for index value). For example, in some embodiments, the first segment of a stream can have sequence number 0, where each successive segment can have its respective segment number increased by 1 (or any other suitable incremental value).

In some embodiments, a user device can access non-head segments of a stream by adding one or more URL parameters to a base URL in a request. For example, in some embodiments, adding a "sq" parameter to a base URL that identifies a particular content stream can locate a specific segment of that stream by sequence number. Continuing with this example, in some embodiments, adding "sq=0" to a base URL can locate the first segment of a stream identified by the base URL, adding "sq=1" can locate the second segment of a stream, etc. As another example, in some embodiments, adding a "headm" parameter to a base URL can locate a segment of a stream that is a specified number of segments behind the head segment. Continuing with this example, in some embodiments, adding "headm=1" to a base URL can locate a segment that is immediately prior to a head segment, adding "headm=2" to a base URL can locate a segment that is two segments prior to a head segment, etc. In some embodiments, adding "headm=0" to a base URL can be equivalent to not providing any "headm" parameter.

In some embodiments, the mechanisms described herein can be used to resolve the request to a segment of a content stream, as described below in connection with FIGS. 1 and 2. For example, in some embodiments, the mechanisms described herein can be used to receive a request for a URL, identify a format of the content stream associated with the request, identify a sequence number associated with the request, and/or identify a segment of the content stream associated with the request, as described below in connection with FIG. 2. In some embodiments, the mechanisms described herein can be used to load a segment file associated with the identified segment and/or return the segment file, as described below in connection with FIG. 1. Note that, in some embodiments, the mechanisms described herein can be used to embed metadata in a container format of the segment file. Accordingly, in some embodiments, the mechanisms described herein can allow arbitrary application-level metadata to be supported without requiring support at the content delivery network level to cache metadata that is separate from the segment file. Additionally, in some embodiments, the mechanisms described herein can allow delivery of streaming content without requiring periodic delivery of a separate manifest file containing the metadata and/or information to discover new segments of a content stream, thereby reducing end-to-end latency.

In some embodiments, the mechanisms described herein can be used to deliver matching segments of a content stream. For example, in some embodiments, the mechanisms described herein can be used to detect a mismatch between segments of a content stream received from a content delivery network, for example to detect a mismatch between a sequence number for a segment of one file of the stream (such as an audio segment file) and a sequence number for a segment of another file of the stream (such as a video segment file) as described below in connection with FIG. 3. In some embodiments, the mechanisms described herein can be used to request one or more URLs for the next segment(s) of the content stream and/or return one or more corresponding segment files, as described below in connection with FIG. 3. For example, in some embodiments, the mechanisms described herein can be used to wait a predetermined amount of time prior to responding to a request for a segment that has yet to be generated, as described below in connection with FIG. 3. Accordingly, in some embodiments, the mechanisms described herein can allow player applications to issue requests for the next segment before it exists, thereby reducing and/or eliminating the contribution of network request latency, which can reduce end-to-end latency.

In some embodiments, the mechanisms described herein can be used to deliver a segment for a specified point in history of a content stream. For example, in some embodiments, the mechanisms described herein can be used to detect an input to seek to a point in history of a content stream, such as a user input associated with a timeline representation of the content stream and/or any other suitable input, as described below in connection with FIG. 3. In some embodiments, the mechanisms described herein can be used to request a URL corresponding to the point in history of the content stream, resolve the request to a segment corresponding to the point in history of the content stream, and/or return a segment file associated with the segment, as described below in connection with FIG. 3. In some embodiments, the mechanisms described herein can be used to play the returned content and/or iteratively issue requests to approach the desired point in history. Accordingly, in some embodiments, the mechanisms described herein can allow a user to view historical parts of a live stream, such as if the user joins the live stream after the live stream has already begun.

In some embodiments, the mechanisms described herein can be used to incrementally stream content. For example, in some embodiments, the mechanisms described herein can be used to resolve a request for a URL to a segment that is still being generated and/or iteratively return portions of a segment file for that segment. As a more particular example, in some embodiments, the mechanisms described herein can be used to first return a portion of that segment that has currently been generated and then incrementally return the rest of the data for that segment in the same response as that data is being generated. Accordingly, in some embodiments, the mechanisms described herein can allow live streams to be played with low latency even while having the efficiency benefits of large segment sizes.

In some embodiments, the mechanisms described herein can be used to improve computer network content streaming. For example, in some embodiments, the mechanisms described herein can obviate periodic delivery of a manifest file by initializing playback with a set of base URLs for each format of a content stream that each locates a dynamically-determined head segment file for that format and by embedding in the segment file metadata that would otherwise be included in the manifest file, thereby reducing end-to-end latency. As another example, the mechanisms described herein can support adaptive resolution playback of a live stream and can allow playback of historical parts of the live stream. As yet another example, the mechanisms described herein can support playing streams with less than one segment of end-to-end latency to allow playback at low latency with the efficiency of large segment sizes.

These and other features for delivering manifestless streaming media content are described further in connection with FIGS. 1-7.

Figure 1:
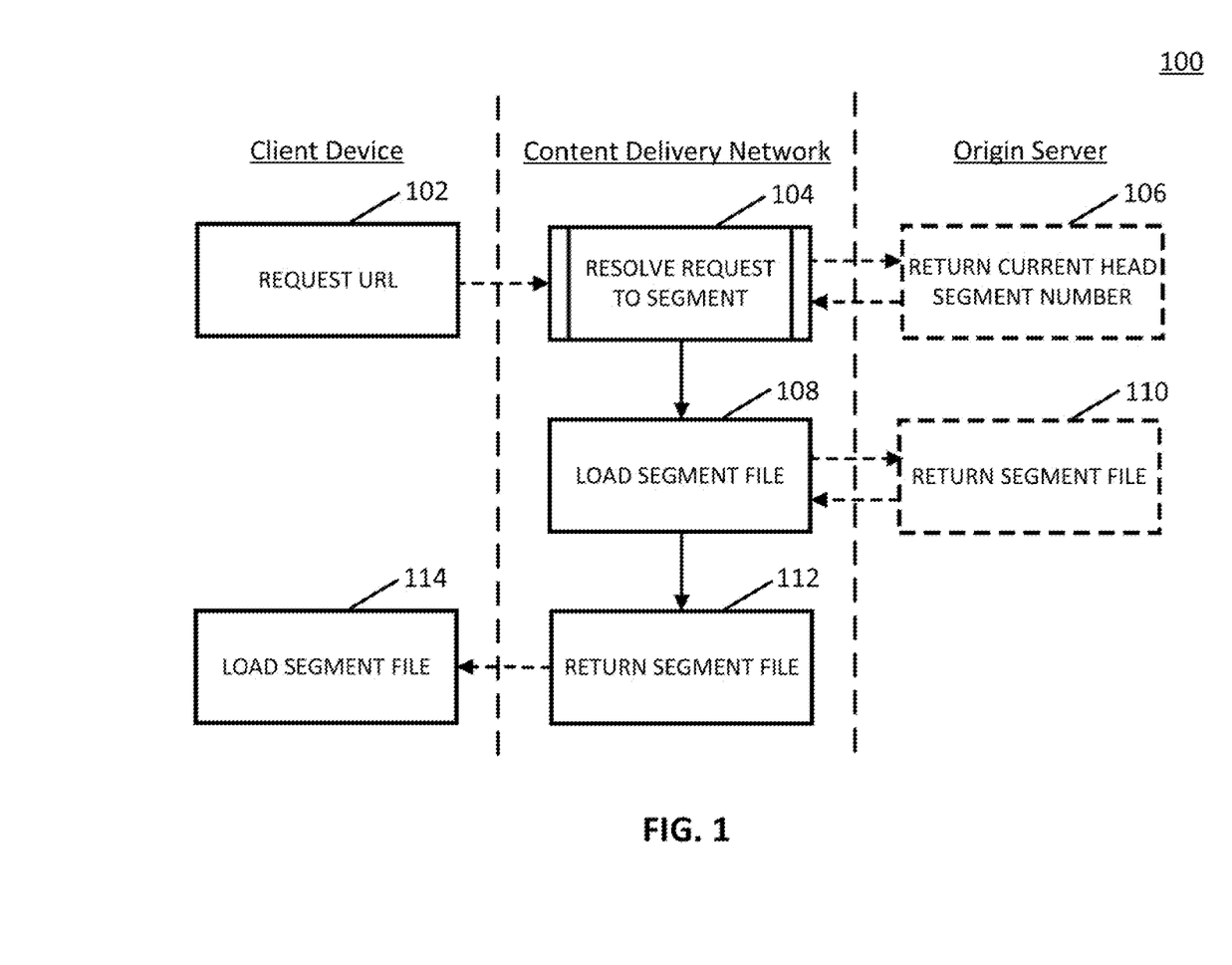
FIG. 1 shows an example of an information flow diagram for delivering manifestless streaming media content in accordance with some embodiments of the disclosed subject matter.

Turning to FIG. 1, an illustrative example 100 of an information flow diagram for delivering streaming content in accordance with some embodiments of the disclosed subject matter is shown. As illustrated, blocks of information flow diagram 100 can be executed by one or more suitable computing devices, such as one or more servers, one or more user devices, and/or any other suitable computing device(s), as shown in and described below in connection with FIGS. 6 and 7.

At 102, a user device can request a URL for playback. For example, in some embodiments, a player application executing on the user device can request a URL for playback of a content stream. In some embodiments, the URL can include a base URL provided by a web server and corresponding to a format of a stream, and one or more of a "sq" parameter corresponding to a sequence number, a "headm" parameter corresponding to a number of segments behind a head segment, and/or any other suitable URL parameter or information. As described hereinbelow, in some embodiments, the user device can, for example, append the one or more parameters to the requested base URL.

Note that, in some embodiments, a content stream can be a live stream and can be provided in one or more formats (e.g., a codec format, a resolution format, an audio format, a video format, and/or any other suitable format). In some embodiments, a live stream can include one or more segments for each format, and each segment can have a respective sequence number.

In some embodiments, the user device can request a URL for playback in any suitable manner. In some embodiments, the user device can request a URL based on one or more factors, such as optimal playback resolution, a specified time point in the history of the content stream, and/or any other suitable factor. For example, in some embodiments, the user device can automatically request a base URL corresponding to an appropriate format using intelligent playback resolution selection based on one or more of current available network bandwidth, a screen size of the user device, current available hardware resources of the user device, and/or any other suitable basis. Additionally or alternatively, in some embodiments, the user device can append one or more parameters, such as a "sq" parameter, a "headm" parameter, and/or any other suitable URL parameter, to the requested base URL to facilitate seeking to a specified point in the history.

At 104, a content delivery network can resolve a request for a URL from the user device to a specific segment of a stream. In some embodiments, the content delivery network can resolve the request to a specific segment identified by a sequence number using any suitable information, such as a base URL including any additional parameters in the URL. In some embodiments, the content delivery network can resolve a request for a URL to a specific segment in any suitable manner.

Figure 2:
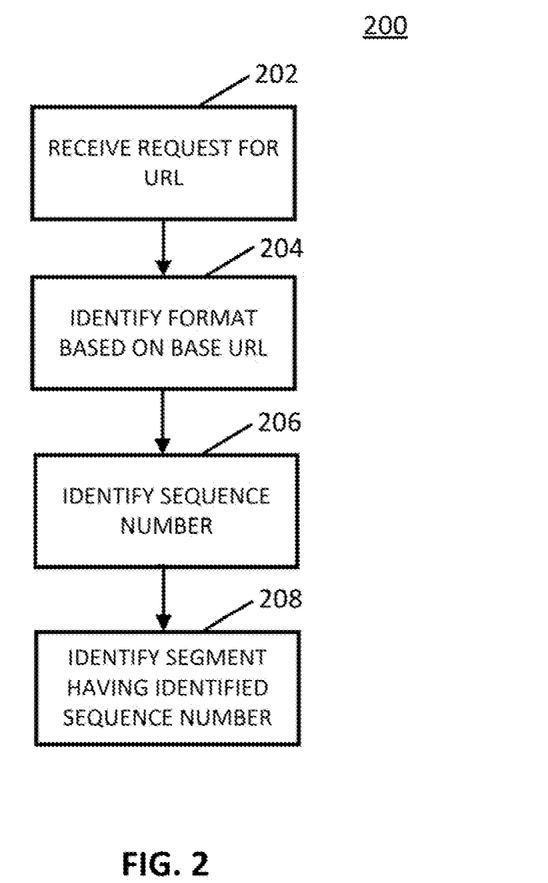
FIG. 2 shows an example of a process for resolving a request for a URL to a segment of a content stream in accordance with some embodiments of the disclosed subject matter.

For example, turning to FIG. 2, an illustrative example 200 of a process for resolving a request for a URL to a segment of a content stream in accordance with some embodiments of the disclosed subject matter is shown. As illustrated, blocks of process 200 can be executed by one or more suitable computing devices, such as one or more servers, one or more user devices, and/or any other suitable computing device(s), as shown in and described below in connection with FIGS. 5 and 6. In some embodiments, blocks of process 200 can be performed in connection with block 104 of FIG. 1.

At 202, a content delivery network can receive a request for a URL from a user device in any suitable manner.

At 204, the content delivery network can identify a format of the content stream associated with the request based on the URL. For example, in some embodiments, the content delivery network can determine a requested format from one or more available formats of the content stream by identifying a format associated with a base URL from the requested URL.

At 206, the content delivery network can identify a sequence number associated with the request based on the URL. For example, in some embodiments, the content delivery network can resolve a base URL to a head sequence number (or a sequence number for a head segment), such as by querying a cache of the head sequence number to determine a current head sequence number. Additionally or alternatively, in some embodiments, the content delivery network can transmit a query to an origin server of the content stream for the head sequence number, and the origin server can, in response, return a current head sequence number, such as at 106. As another example, in some embodiments, the content delivery network can identify a sequence number associated with the request based on a "headm" parameter and/or a "sq" parameter included in the URL.

At 208, a content delivery network can identify a segment of the content stream associated with the request. In some embodiments, a content delivery network can identify a segment having a format matching the identified format associated with the base URL and having a sequence number matching the identified sequence number associated with the request.

Turning back to FIG. 1, at 108, the content delivery network can load a segment file associated with the identified segment referred to by sequence number in the request. In some embodiments, the content delivery network can load a segment file in any suitable manner. For example, in some embodiments, the content delivery network can load the segment file from one or more caches and/or any other suitable location. As another example, in some embodiments, the content delivery network can transmit a query to an origin server of the content stream for the segment file, and the origin server can, in response, return the requested segment file, such as at 110. In some embodiments, the content delivery network can resolve a head sequence number and can load the contents of the head segment in a single query to an origin server.

In some embodiments, a segment file can include audio content, video content, and/or any other suitable content and/or data. In some embodiments, a segment file can include application-level metadata embedded within the audio or video container format. In some embodiments, metadata can be embedded within a container format using a mechanism that the container format supports for embedding information that is not interpreted by media decoders. For example, in some embodiments, metadata can be embedded in an "emsg" atom when the container format is FMP4. As another example, in some embodiments, metadata can be embedded in a tags element when the container format is WebM. It should be noted that, in some embodiments, metadata can be embedded using any suitable mechanism for any suitable container format.

It should also be noted that metadata can include any suitable information. For example, in some embodiments, metadata can include ASCII key-value pairs. As a more particular example, in some embodiments, the key-value pairs can be of the form "Key: Value," and can be delimited by newline characters. As an even more particular example, in some embodiments, metadata can include a key-value pair for the key "Sequence-Number" and a value equal to the sequence number by which the segment file can be located, such as by using the "sq" URL parameter. In some embodiments, the key-value pairs can be encoded according to the same rules as HTTP response headers.

At 112, a content delivery network can return the requested segment file to the user device in any suitable manner. For example, in some embodiments, a content delivery network can return the segment file as an HTTP response and/or any other suitable type of response.

At 114, a user device can receive the segment file from the content delivery network and load the segment file. For example, in some embodiments, a player application executing on a user device can extract video content and/or audio content from the segment file for playback. Additionally or alternatively, the player application can extract the value of the Sequence-Number key from the metadata of the segment file in order to determine which segment file has been returned by the content delivery network. Note that, in some embodiments, the player application can determine which segment file has been returned when the player application loads a segment file with indeterminate sequence number, such as when loading a segment file in response to a request for a base URL or using a "headm" parameter.

Figure 3:
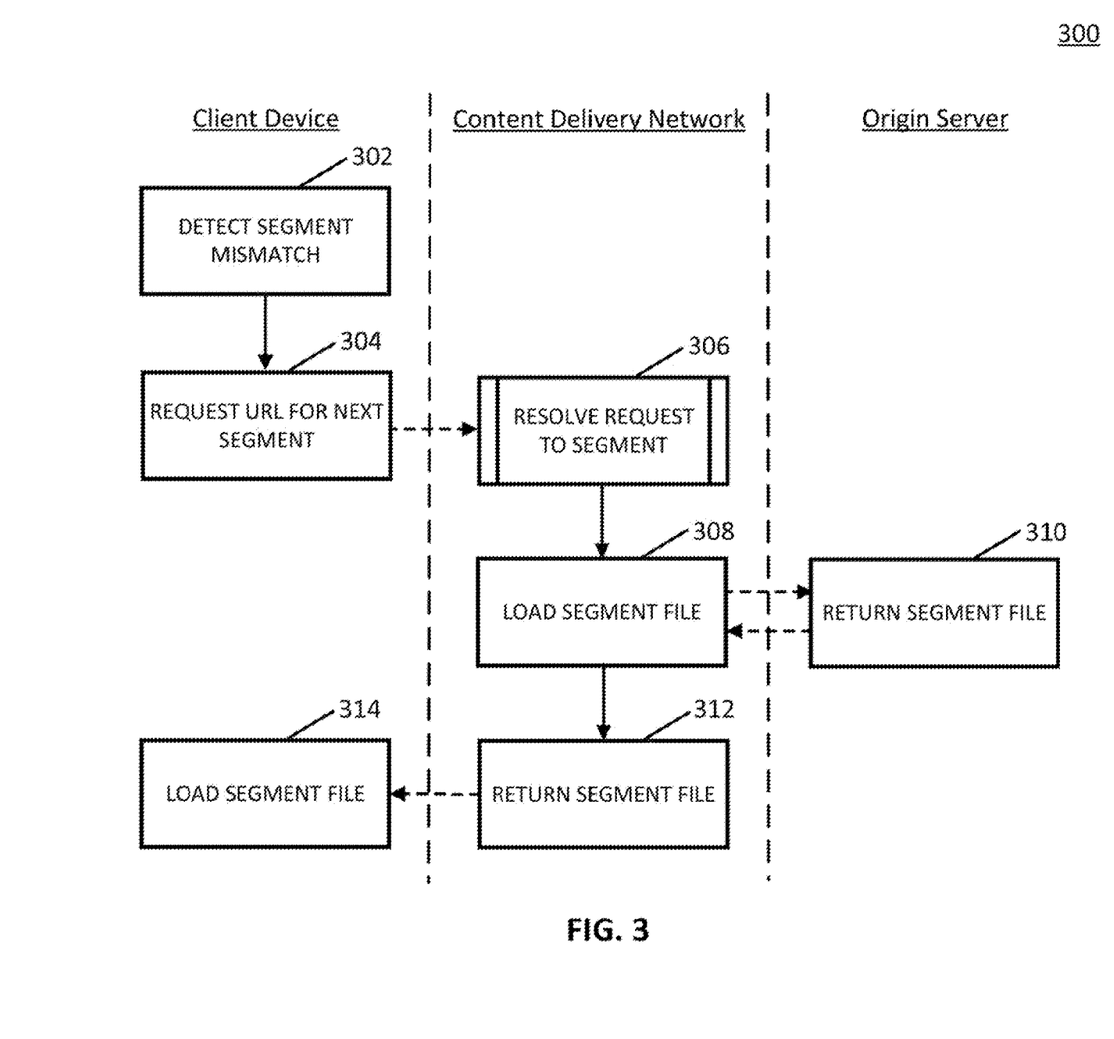
FIG. 3 shows an example of an information flow diagram for delivering matching segments of a content stream in accordance with some embodiments of the disclosed subject matter.

Turning to FIG. 3, an illustrative example of an information flow diagram for delivering matching segments of a content stream in accordance with some embodiments of the disclosed subject matter is shown. As illustrated, blocks of information flow diagram 300 can be executed by one or more suitable computing devices, such as one or more servers, one or more user devices, and/or any other suitable computing device(s), as shown in and described below in connection with FIGS. 6 and 7.

At 302, a user device can detect a mismatch between segments of a content stream received from a content delivery network. For example, in some embodiments, a player application executing on the user device can detect a mismatch between a sequence number for an audio segment file and a sequence number for a video segment file received from a content delivery network, such as by extracting the value of the Sequence-Number key from the metadata of each segment file. It should be noted that the user device can detect a mismatch between segments in any suitable manner.

At 304, the user device can request one or more URLs for the next segment(s) of the content stream. For example, in some embodiments, a player application executing on the user device can, for each of a next audio segment and/or a next video segment, request a base URL including the "sq" parameter set to the current value of the Sequence-Number key plus one. Note that, in some embodiments, the player application can determine a higher sequence number between the sequence number for the audio segment file and the sequence number for the video segment file, and the player application can set the "sq" parameter to the higher sequence number plus one. It should be noted that the user device can request the URL(s) in any suitable manner.

At 306, a content delivery network can receive one or more requests for one or more URLs from the user device and can resolve the request(s) to the next segment(s) of the content stream. In some embodiments, the content delivery network can resolve a request for a URL from the user device in any suitable manner, such as described above in connection with FIG. 2. In some embodiments, the content delivery network can determine that a request includes a "sq" parameter that is set to a value that is greater than a sequence number for the latest segment that is available to load. In some embodiments, the content delivery network can wait a predetermined duration (e.g., several seconds and/or any suitable duration) for the next segment to be generated prior to querying the origin server for the next segment and/or prior to responding to the request from the user device.

At 308, the content delivery network can load the segment file(s) associated with the segment(s) referred to by sequence number in the request. In some embodiments, the content delivery network can transmit a query to an origin server of the content stream for the segment file(s), and the origin server can, in response, return the requested segment file(s), such as at 310. In some embodiments, the origin server can wait a predetermined duration (e.g., several seconds and/or any suitable duration) for the next segment(s) to be generated prior to responding to the request(s) from the content delivery network.

At 312, the content delivery network can return the requested segment file(s) to the user device in any suitable manner. For example, in some embodiments, the content delivery network can return the segment file(s) as an HTTP response.

At 314, the user device can receive the segment file(s) from the content delivery network and can load the segment file(s) having matching sequence numbers in any suitable manner. For example, in some embodiments, a player application executing on the user device can extract video content and/or audio content from the segment file for playback.

Figure 4:
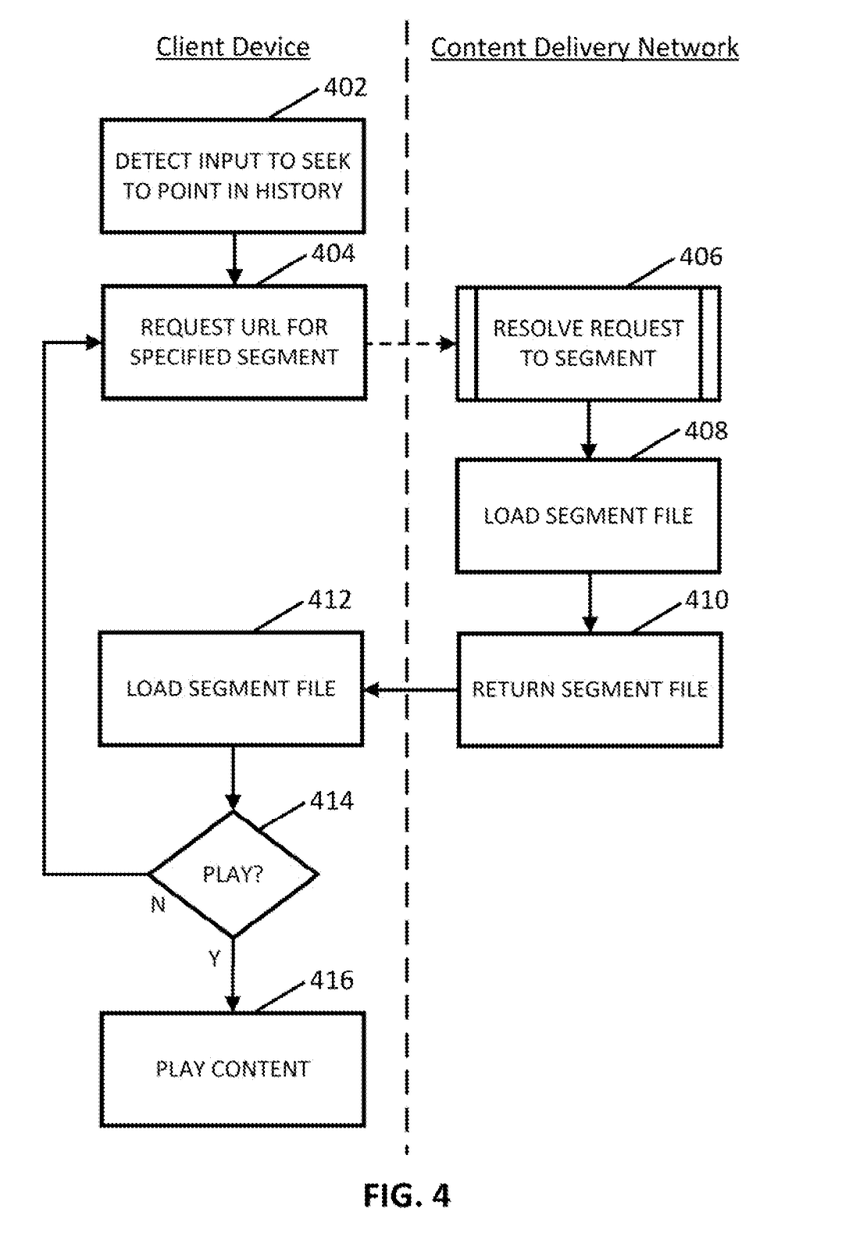
FIG. 4 shows an example of an information flow diagram for delivering a segment for a specified point in history of a content stream in accordance with some embodiments of the disclosed subject matter.

Turning to FIG. 4, an illustrative example of an information flow diagram for delivering a segment for a specified point in history of a content stream in accordance with some embodiments of the disclosed subject matter is shown. As illustrated, blocks of information flow diagram 300 can be executed by one or more suitable computing devices, such as one or more servers, one or more user devices, and/or any other suitable computing device(s), as shown in and described below in connection with FIGS. 6 and 7.

At 402, a user device can detect an input to seek to a point in history of a content stream in any suitable manner. For example, in some embodiments, the player application can detect that a user has selected a portion of a visual representation corresponding to a timeline of a content stream to specify a point in the history to seek and/or any other suitable input.

Note that, in some embodiments, an origin server can use a predetermined, approximately consistent segment duration for each content stream, therefore the relative difference in elapsed stream time between two segments can be approximately equal to the difference in their sequence number values multiplied by the predetermined segment duration of the content stream. For example, in some embodiments, given a predetermined segment duration of three seconds, the elapsed stream time between the first segment of a content stream and the tenth segment of a content stream can be approximately equal to: (10×3 seconds)–(0×3 seconds)=30 seconds.

At 404, the user device can request a URL for a segment corresponding to the specified point in history of the content stream in any suitable manner. For example, in some embodiments, the player application can request a URL for a segment whose elapsed stream time is approximately equal to the specified point in history of the content stream, such as by using a "sq" parameter and/or any other suitable URL parameter. As a more particularly example, in some embodiments, given a predetermined segment duration of three seconds and a user request for seeking to a point corresponding to thirty seconds into the content stream, the player application can request a URL for the tenth segment by using a "sq" parameter set to a value of 10.

At 406, the content delivery network can resolve the request for a URL from the user device to a specific segment of a stream, such as identified by sequence number using a "sq" parameter in the request in some embodiments. In some embodiments, the content delivery network can resolve the request for the URL from the user device in any suitable manner, such as described above in connection with FIG. 2.

At 408, the content delivery network can load a segment file associated with the segment referred to by sequence number in the request. For example, in some embodiments, the content delivery network can load the segment file from one or more caches, an origin server of the content stream, and/or any other suitable location.

At 410, the content delivery network can return the requested segment file to the user device in any suitable manner. For example, in some embodiments, a content delivery network can return the segment file as an HTTP response and/or any other suitable type of response. Additionally, in some embodiments, the content delivery network can return HTTP response headers identifying the current head sequence number, the exact current elapsed stream time, and/or any other suitable information.

At 412, the user device can receive the segment file from the content delivery network and load the segment file. For example, in some embodiments, the player application can determine which segment file has been returned by the content delivery network and/or an elapsed stream time of the sequence file, such as by extracting the value of the Sequence-Number key from the metadata of the segment file or in any other suitable manner.

At 414, the user device can determine whether to play the returned segment file based on the elapsed stream time of the returned segment file. For example, in some embodiments, the player application can compare an elapsed stream time of the returned segment to the specified point in history of the content stream. If the player application determines that the elapsed stream time of the returned segment matches the specified point in history of the content stream, then the player application can play the content of the returned segment file at 416 in some embodiments. If the player application determines that the elapsed stream time of the returned segment does not match the specified point in history of the content stream, then, in some embodiments, the player application can either continue to play the content from the elapsed stream time of the returned segment file at 416 or the player application can return to 404 to iteratively issue requests to approach the desired elapsed stream time.

Note that, in some embodiments, the user device can use information from the response headers returned at 410 when playing the content in 416. For example, in some embodiments, the playback application can use the current head sequence number and/or the exact current elapsed stream time to extend a visual representation of the timeline including newly-generated segments even while the player application is playing historical parts of the content stream.

Figure 5:
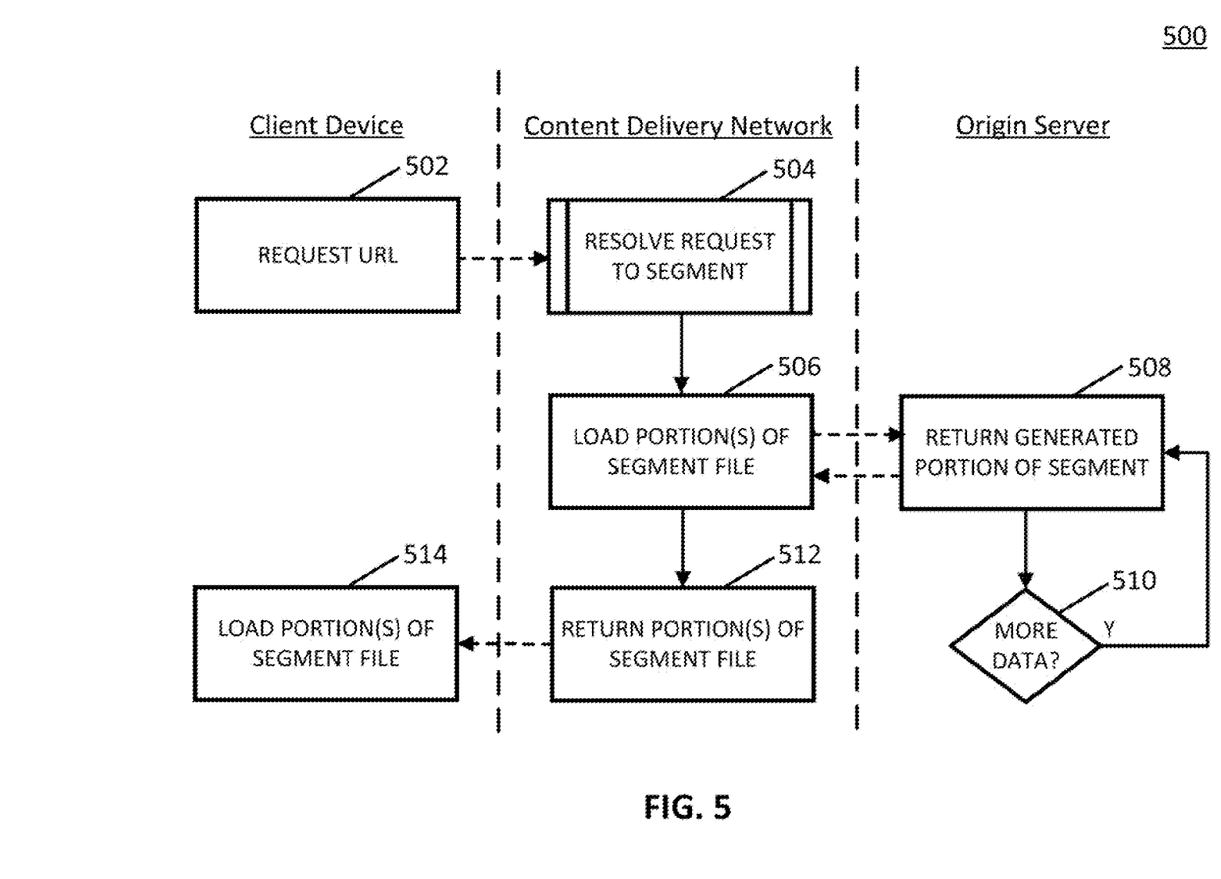
FIG. 5 shows an example of an information flow diagram for incremental streaming in accordance with some embodiments of the disclosed subject matter.

Turning to FIG. 5, an illustrative example of an information flow diagram for incremental streaming in accordance with some embodiments of the disclosed subject matter is shown. As illustrated, blocks of information flow diagram 500 can be executed by one or more suitable computing devices, such as one or more servers, one or more user devices, and/or any other suitable computing device(s), as shown in and described below in connection with FIGS. 6 and 7.

At 502, a user device can request a URL for playback. For example, in some embodiments, a player application executing on the user device can request a URL including a base URL, a "headm" parameter set to a value of 0, and/or a "sq" parameter set to a sequence number for a segment that is still being generated.

At 504, a content delivery network can resolve the request for the URL from the user device to a segment that is still being generated in any suitable manner. In some embodiments, a content delivery network can resolve the request for the URL from the user device in any suitable manner, such as described above in connection with FIG. 2.

At 506, the content delivery network can load portion(s) of the segment file for the requested segment in any suitable manner. For example, in some embodiments, a content delivery network can query an origin server of the content stream for one or more portions of the requested segment file.

At 508, an origin server can receive a request for a segment that is still being generated and can incrementally return portions of the segment as the portions are being generated. For example, in some embodiments, an origin server can first return to the content delivery network a portion of the segment that has currently been generated and then incrementally return the rest of the data for that segment in the same response as the data continues to be generated at 510.

Note that, in some embodiments, an origin server and/or a content delivery network can return a generated portion of the segment using a response encoding that allows returning responses with indefinite byte length. For example, in some embodiments, an origin server and/or a content delivery network can respond using chunked transfer encoding, such as identified by the HTTP response header "transfer-encoding: chunked" when using an HTTP protocol. Additionally, in some embodiments, the responses can use a container format that supports incremental streaming. For example, in some embodiments, the container format can include one "moof" atom for each frame of audio and/or video.

At 512, the content delivery network can return one or more portions of the segment to the user device as they are received from the origin server in a single response.

At 514, the user device can receive and load portions of the segment from the content delivery network.

Figure 6:
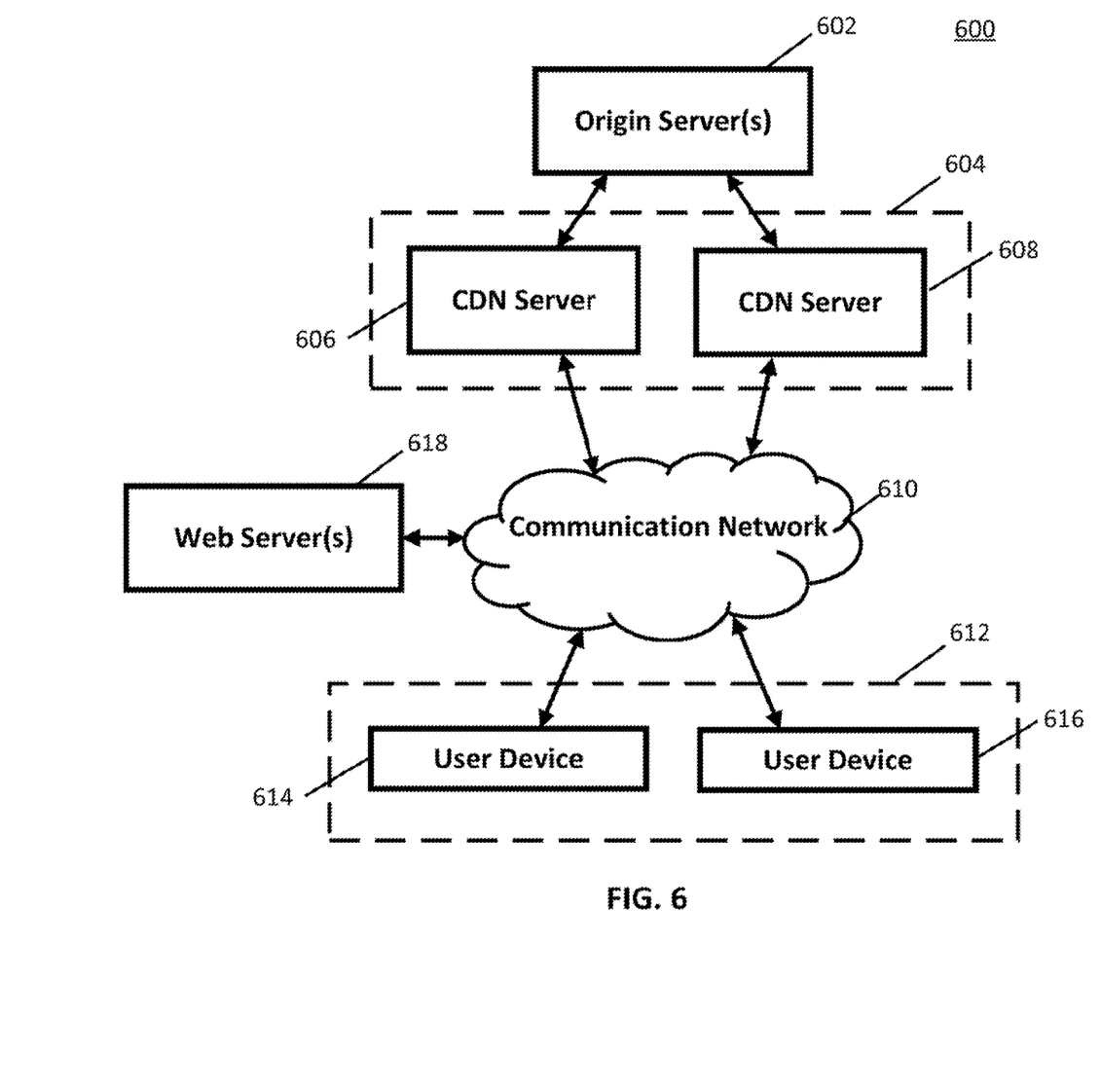
FIG. 6 shows a schematic diagram of an illustrative system suitable for implementation of mechanisms described herein for delivering manifestless streaming media content in accordance with some embodiments of the disclosed subject matter.

Turning to FIG. 6, an example 600 of hardware for delivering streaming content that can be used in accordance with some embodiments of the disclosed subject matter is shown. As illustrated, hardware 600 can include an origin server 602, a content delivery network 604 including one or more servers, such as server 606 and server 608, a communication network 610, one or more user devices 612, such as user device 614 and user device 616, and/or a web server 618.

Origin server 602 can be any suitable server for storing information, data, programs, and/or any other suitable type of content for delivering streaming content. In some embodiments, origin server 602 can store one or more segment files for each format of a content stream. In some embodiments, origin server 602 can store a current head sequence number for a head segment of a live stream. In some embodiments, origin server 602 can store any other suitable content or information. In some embodiments, origin server 602 can perform any suitable function(s), such as returning a head sequence number, returning one or more segment files, and/or incrementally returning one or more portions of one or more segments as the portions are generated, as described above in connection with FIGS. 1 and 3-5.

Content delivery network 604 can be any suitable network for storing information, data programs, and/or any other suitable type of content for delivering streaming content. Note that, in some embodiments, a content delivery network as described herein can be implemented by one or more suitable computing devices, such as server 606 and/or server 608, which can be any suitable server(s) for storing information, data, programs, and/or any other suitable type of content. For example, in some embodiments, server 606 and/or server 608 can store one or more segment files for one or more formats of a content stream. Additionally, in some embodiments, server 606 and/or server 608 can store one or more head sequence numbers for a live stream, such as in one or more caches. In some embodiments, origin server 602 can perform any suitable function(s), such as receiving a request for a URL, resolving a request to a segment of a content stream, identifying a format, identifying a sequence number, identifying a segment, loading a segment file, returning one or more segment files, and/or incrementally returning one or more portions of one or more segments as the portions are generated, as described above in connection with FIGS. 1-5.

Communication network 610 can be any suitable combination of one or more wired and/or wireless networks in some embodiments. For example, communication network 610 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. In some embodiments, origin server 602 can be connected by one or more communications links to communication network 610 via content delivery network 604. In some embodiments, communication network 610 can be linked via one or more communications links to content delivery network 604, user device(s) 612, and/or web server 618. The communications links can be any communications links suitable for communicating data among user device(s) 612, origin server 602, content delivery network 604, and web server 618 such as network links, dial-up links, wireless links, hard-wired links, any other suitable communications links, or any suitable combination of such links.

Web server 618 can be any suitable server(s) for storing information, data, programs, and/or any other suitable type of content. In some embodiments, web server 618 can perform any suitable function(s), such as providing one or more base URLs for one or more formats of a content stream, as described above in connection with FIGS. 1-5.

User device(s) 612 can include any one or more user devices for presenting streaming content. For example, in some embodiments, user device(s) 612 can include a television, speakers, a mobile phone, a tablet computer, a desktop computer, a laptop computer, a vehicle entertainment system, a wearable computer, and/or any other suitable type of user device. In some embodiments, user device(s) 612 can include a player application stored in memory and executed by user device(s) 612 for presenting streaming content. In some embodiments, user device(s) 612 can perform any suitable function(s), such as requesting a URL for playback, detecting mismatched segments of a stream, detecting an input to seek to a point in history of a stream, loading a received segment file, and/or playing content, as described above in connection with FIGS. 1-5.

Although origin server 602, server 606, server 608, and web server 618 are each illustrated as one device, the functions performed by origin server 602, server 606, server 608, and web server 618 can be performed using any suitable number of devices in some embodiments. For example, in some embodiments, multiple devices can be used to implement the functions performed by each of origin server 602, server 606, server 608, and web server 618.

Although two user devices 614 and 616 are shown in FIG. 6 to avoid over-complicating the figure, any suitable number of user devices, and/or any suitable types of user devices, can be used in some embodiments.

Origin server 602, server 606, server 608, user devices 612, and web server 618 can be implemented using any suitable hardware in some embodiments. For example, in some embodiments, devices 602, 606, 608, 612, and 618 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 700 of FIG. 7, such hardware can include hardware processor 702, memory and/or storage 704, an input device controller 706, an input device 708, display/audio drivers 710, display and audio output circuitry 712, communication interface(s) 714, an antenna 716, and a bus 718.

Figure 7:
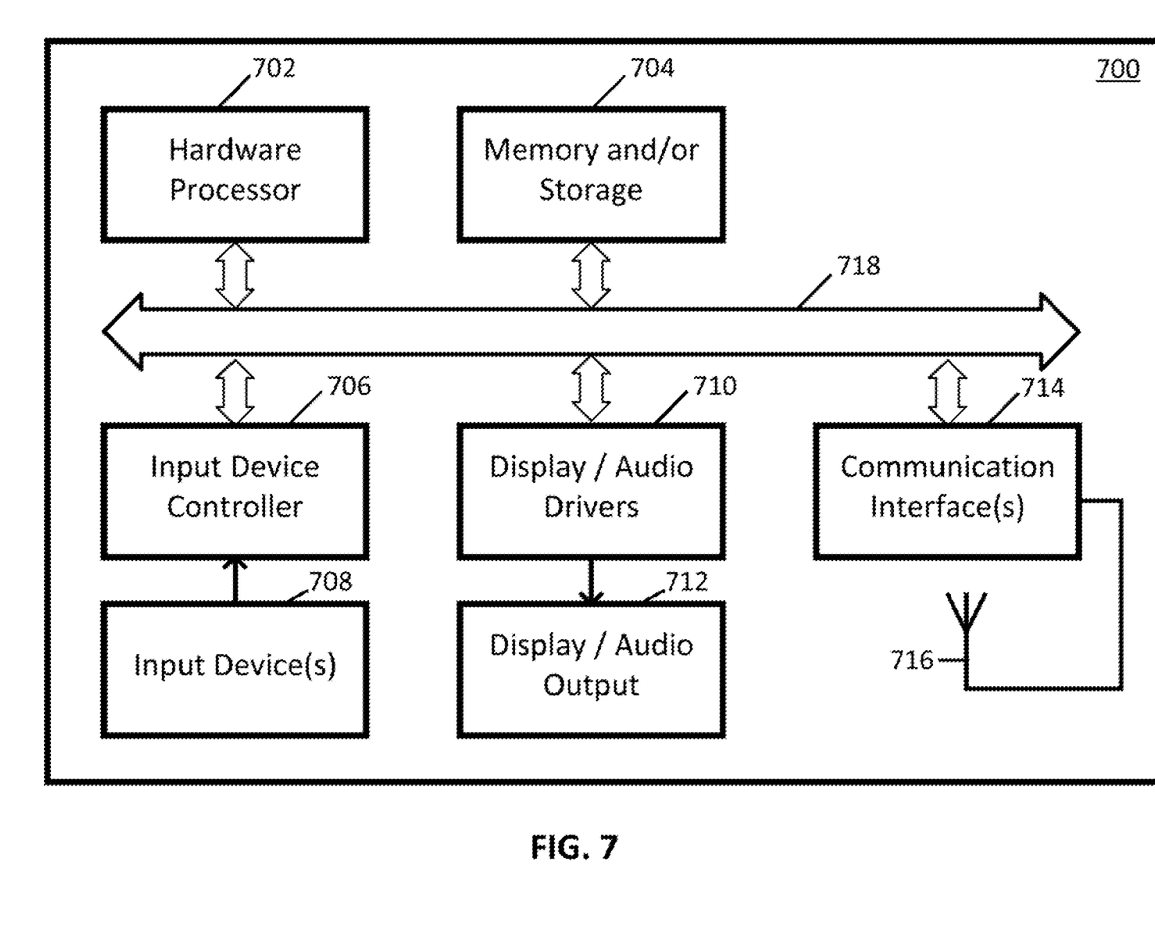
FIG. 7 shows a detailed example of hardware that can be used in a server and/or a user device of FIG. 6 in accordance with some embodiments of the disclosed subject matter.

Hardware processor 702 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 702 can be controlled by a server program stored in memory and/or storage of a server, such as server 606 and/or server 608. For example, in some embodiments, the server program can cause hardware processor 702 to receive a request for a URL, resolve a request to a segment of a content stream, identify a format, identify a sequence number, identify a segment, return a head sequence number, load a segment file, return one or more segment files, incrementally return one or more portions of one or more segments as the portions are generated, provide one or more base URLs for one or more formats of a content stream, and/or perform any other suitable functions. In some embodiments, hardware processor 702 can be controlled by a program stored in memory and/or storage of a user device, such as user device 612 and/or user device 616. For example, in some embodiments, the program can cause hardware processor 702 to request a URL for playback, detect mismatched segments of a stream, detect an input to seek to a point in history of a stream, load a received segment file, play content, and/or perform any other suitable functions.

Memory and/or storage 704 can be any suitable memory and/or storage for storing programs, data, and/or any other suitable information in some embodiments. For example, memory and/or storage 704 can include random access memory, read-only memory, flash memory, hard disk storage, optical media, and/or any other suitable memory.

Input device controller 706 can be any suitable circuitry for controlling and receiving input from one or more input devices 708 in some embodiments. For example, input device controller 706 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 710 can be any suitable circuitry for controlling and driving output to one or more display/audio output devices 712 in some embodiments. For example, display/audio drivers 710 can be circuitry for driving a touchscreen, a flat-panel display, a cathode ray tube display, a projector, a speaker or speakers, and/or any other suitable display and/or presentation devices.

Communication interface(s) 714 can be any suitable circuitry for interfacing with one or more communication networks (e.g., communication network 610). For example, interface(s) 714 can include network interface card circuitry, wireless communication circuitry, and/or any other suitable type of communication network circuitry.

Antenna 716 can be any suitable one or more antennas for wirelessly communicating with a communication network (e.g., communication network 610) in some embodiments. In some embodiments, antenna 716 can be omitted.

Bus 718 can be any suitable mechanism for communicating between two or more components 702, 704, 706, 710, and 714 in some embodiments.

Any other suitable components can be included in hardware 700 in accordance with some embodiments.

In some embodiments, at least some of the above described blocks of the processes of FIGS. 1-5 can be executed or performed in any order or sequence not limited to the order and sequence shown in and described in connection with the figures. Also, some of the above blocks of FIGS. 1-5 can be executed or performed substantially simultaneously where appropriate or in parallel to reduce latency and processing times. Additionally or alternatively, some of the above described blocks of the processes of FIGS. 1-5 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for delivering manifestless streaming media content are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for delivering live streaming content, the method comprising:
   receiving, from a user device, a request for a URL corresponding to a format of a live stream that is provided in a plurality of formats, wherein the live stream comprises a plurality of segments for each of the plurality of formats and wherein each segment of the plurality of segments comprises a respective sequence number;
   resolving the request to a specific segment of the live stream by identifying the format of the live stream associated with the request from the plurality of formats based on the requested URL;
   loading a segment file corresponding to the specific segment; and
   returning the segment file to the user device in a response to the request.

2. The method of claim 1, wherein the URL comprises a base URL, and wherein the format of the live stream associated with the request is identified from the plurality of formats based on the base URL.

3. The method of claim 1, further comprising identifying a sequence number associated with the request based on the requested URL, wherein the segment file comprises metadata indicating the identified sequence number.

4. The method of claim 3, further comprising identifying a segment of the plurality of segments corresponding to the identified format and having a sequence number matching the identified sequence number.

5. The method of claim 4, wherein the sequence number is identified by determining a current head sequence number for a most recent segment that is available for playback of the one or more segments, wherein the identified sequence number is the current head sequence number and wherein the identified segment is the most recent segment that is available for playback.

6. The method of claim 3, wherein the sequence number is identified by identifying a sequence number associated with the request that is greater than a sequence number for a most recently complete segment that is available to load based on the URL.

7. The method of claim 6, further comprising:
iteratively loading one or more portions of the segment file as the one or more portions are being generated; and
iteratively returning the generated one or more portions to the user device in a single response.

8. A system for delivering live streaming content, the system comprising:
a hardware processor that:
receives, from a user device, a request for a URL corresponding to a format of a live stream that is provided in a plurality of formats, wherein the live stream comprises a plurality of segments for each of the plurality of formats and wherein each segment of the plurality of segments comprises a respective sequence number;
resolves the request to a specific segment of the live stream by identifying the format of the live stream associated with the request from the plurality of formats based on the requested URL;
loads a segment file corresponding to the specific segment; and
returns the segment file to the user device in a response to the request.

9. The system of claim 8, wherein the URL comprises a base URL, and wherein the format of the live stream associated with the request is identified from the plurality of formats based on the base URL.

10. The system of claim 8, wherein the hardware processor further identifies a sequence number associated with the request based on the requested URL, wherein the segment file comprises metadata indicating the identified sequence number.

11. The system of claim 10, wherein the hardware processor further identifies a segment of the plurality of segments corresponding to the identified format and having a sequence number matching the identified sequence number.

12. The system of claim 11, wherein the sequence number is identified by determining a current head sequence number for a most recent segment that is available for playback of the one or more segments, wherein the identified sequence number is the current head sequence number and wherein the identified segment is the most recent segment that is available for playback.

13. The system of claim 10, wherein the sequence number is identified by identifying a sequence number associated with the request that is greater than a sequence number for a most recently complete segment that is available to load based on the URL.

14. The system of claim 13, wherein the hardware processor further:
iteratively loads one or more portions of the segment file as the one or more portions are being generated; and
iteratively returns the generated one or more portions to the user device in a single response.

15. A non-transitory computer-readable medium for delivering live streaming content, the method comprising:
receiving, from a user device, a request for a URL corresponding to a format of a live stream that is provided in a plurality of formats, wherein the live stream comprises a plurality of segments for each of the plurality of formats and wherein each segment of the plurality of segments comprises a respective sequence number;
resolving the request to a specific segment of the live stream by identifying the format of the live stream associated with the request from the plurality of formats based on the requested URL;
loading a segment file corresponding to the specific segment; and
returning the segment file to the user device in a response to the request.

16. The non-transitory computer-readable medium of claim 15, wherein the URL comprises a base URL, and wherein the format of the live stream associated with the request is identified from the plurality of formats based on the base URL.

17. The non-transitory computer-readable medium of claim 15, wherein the method further comprises identifying a sequence number associated with the request based on the requested URL, wherein the segment file comprises metadata indicating the identified sequence number.

18. The non-transitory computer-readable medium of claim 17, wherein the method further comprises identifying a segment of the plurality of segments corresponding to the identified format and having a sequence number matching the identified sequence number.

19. The non-transitory computer-readable medium of claim 18, wherein the sequence number is identified by determining a current head sequence number for a most recent segment that is available for playback of the one or more segments, wherein the identified sequence number is the current head sequence number and wherein the identified segment is the most recent segment that is available for playback.

20. The non-transitory computer-readable medium of claim 17, wherein the sequence number is identified by identifying a sequence number associated with the request that is greater than a sequence number for a most recently complete segment that is available to load based on the URL.

21. The non-transitory computer-readable medium of claim 20, wherein the method further comprises:
iteratively loading one or more portions of the segment file as the one or more portions are being generated; and
iteratively returning the generated one or more portions to the user device in a single response.

* * * * *